United States Patent Office 3,151,678
Patented Oct. 6, 1964

3,151,678
METHOD OF FRACTURING FORMATIONS
Alden W. Hanson, Midland, Mich., and Orlin W. Lyons, Houston, Tex., assignors to The Dow Chemical Company, Midland, Mich., a corporation of Delaware
No Drawing. Filed Sept. 2, 1958, Ser. No. 758,579
4 Claims. (Cl. 166—42)

The invention is concerned with an improved method of fracturing fluid-bearing formations traversed by a well.

The amount of a fluid obtained without further treatment from a well penetrating a fluid-bearing formation usually falls off after a period of production. This period varies according to the characteristics of the formation and of the fluid being produced. To increase the rate of production and the period of production life of a well, well treatments, e.g., fracturing, are widely practiced.

Fracturing briefly comprises injecting into a well penetrating a fluid-bearing formation, any liquid which, due to pressure it produces therein, causes fracturing of the strata in the formation thus opening up communicating passageways in the form of cracks, fissures, and the like between the wellbore and more remote portions of the fluid-bearing formation. A propping agent, e.g., sand, is often suspended in the fracturing liquid. The objective to be attained by the suspended propping agent is to aid in propping open the passageways thus produced and thereby to retain the benefits of the fracturing operation.

The above objective, by the use of a propping agent, is often not fully attained, or in some instances, is not attained to any noticeable extent at all. Among the principal reasons for the failure to attain the objective are lodging of the propping agent in previously existing passageways, in only the more accessible of the newly created passageways, or even in the bottom of the wellbore. To realize the benefits to be derived from fracturing a formation wherein a propping agent is employed, a substantial portion of the propping agent must be deposited in the newly created passageways and particularly in the smaller and more remote ones.

There is accordingly a need in the art of fracturing a formation traversed by a well for a more effective method of opening up and propping open new communicating passageways in the formation.

The principal object of the invention, therefore, is to provide such a method.

The method of attaining this and related objects will be made clear in the ensuing description and is particularly pointed out in the appended claims.

The invention is an improved method of treating a fluid-bearing formation traversed by a wellbore consisting essentially of injecting one or more fracturing liquids down the wellbore, at least one of which contains a propping agent suspended therein, and repeatedly varying the rate of injection of at least one of the fracturing liquids or of the concentration of the propping agent therein to impart a surging action whereby a fracturing liquid at a high rate of flow or of low propping agent content creates fractures and a fracturing liquid at a relatively low rate of flow or of high propping gent content which deposits propping agent in the fractures thus produced. The propping agent serves both as a prop to prevent the fractures from closing and as a semi-permeable plug for increasing the resistance to the flow of fracturing liquid through the more accessible fractures during the fracturing operation, thereby diverting the flow to the newly created less accessible fractures. The frequency and number of repetitions depend upon the conditions of the well being treated.

In the practice of the invention the surging effect may be attained by one of a number of embodiments.

According to one embodiment, only one flow system for the fracturing liquid is employed. The surging effect is attained by alternately building up the flow rate of the fracturing liquid containing at least two pounds of propping agent per gallon until a fracture is indicated by a drop in pressure and then decreasing the flow rate to a value approaching but not reaching that at which the propping agent might be expected to screen out in the bottom of or immediately adjacent to the bottom of the wellbore and repeating the variations in rate of flow, the number of repetitions depending upon the conditions of the well.

According to the second embodiment, only one flow system for the fracturing liquid is employed as in the above embodiment, but it differs therefrom in that the surging effect is attained by injecting the fracturing liquid at a more or less constant rate of flow but the propping agent concentration is alternately increase to a value approaching the maximum that can be suspended therein and decreased to a value approaching no propping agent.

As a third embodiment, the variations in rate of flow and of the propping agent content of a single fracturing liquid may be combined. For example, the rate of flow may be increased while simultaneously decreasing the propping agent until fracturing is indicated and then decreasing the rate of flow while increasing the propping agent content until deposition of the propping agent is indicated by a rise in pressure, and thereafter repeating the steps. The rate of flow of the fracturing liquid carrying the high content of propping agent must not be dropped to a value at which the propping agent might be expected to screen out in or immediately adjacent to the bottom of the wellbore.

As a fourth embodiment of the invention, there may be employed a plurality of flow systems for carrying fracturing liquids into the well which act simultaneously. For example, one system is made to carry a fracturing liquid containing little or no propping agent at a substantially constant and relatively high rate of flow. A second flow system is made to carry a fracturing liquid having a high content of propping agent at a flow rate which varies between a value just below the rate of the low-content propping agent fracturing liquid and a value at which screening out of the propping agent in the bottom of the wellbore or immediately adjacent thereto might occur. Or as another example of this embodiment, and one preferred in practice, one flow system is made to carry a liquid having a relatively high content of propping agent, preferably at least 4 pounds per gallon, at a substantially constant rate of flow. A second system is made to carry a fracturing liquid of relatively low or no propping agent at a flow rate which is varied from zero to a rate in excess of that of the constant rate liquid having a relatively high content of propping agent.

As a fifth embodiment of the invention, there is employed a plurality of flow systems for carrying fracturing liquids into the well similar to the fourth embodiment above but wherein the two liquids are injected alternately into the well, i.e., one flow system is stopped when the other is started. For example, the liquid having the high propping agent content is injected, then stopped, and the liquid having a low content or no propping agent is started. The rate of flow of the liquid, having the high propping agent content should not exceed the highest rate of flow attained by the liquid having the low propping agent content.

As a still further embodiment, the cycles of flow of the fracturing liquids described in the paragraph above may overlap. For example, as the rate of flow of the fracturing liquid having the low propping agent content is dropping off the fracturing liquid having the high propping agent content may be started into the well and before it is shut off the low content propping agent fracturing liquid may again be started. The peak of the rate of flow of the liquid of low propping agent content should be greater than the peak of the rate of flow of the liquid of high propping agent content.

A particularly good working arrangement is to employ two pumping systems, one for supplying a slurry carrying between 2 and 10 pounds of a propping agent and the second pumping system supplying a liquid which is substantially free of suspended material which may be referred to as the diluent. The pumping system supplying the slurry is maintained at a substantially uniform rate of flow and the system supplying the diluent is varied from a value approaching zero to a value in excess of the rate of flow of the slurry. The rate of flow of the diluent is usually increased to a value approaching about ten times the rate of flow of the slurry.

Any of the known propping agents useful in well fracturing may be employed as a propping agent of the invention. Ottawa sand of a 20–60 mesh size and preferably 20–40 mesh is preferred. The fracturing liquid may be water, gelled water, kerosene, refined oil, crude oil, gelled or thickened oil, or a water-oil emulsion. One or both liquids may contain an acid and/or a corrosion inhibitor, as described in U.S. Patent 1,877,504 to Grebe et al. Examples of liquids suitable for fracturing wells according to the invention are those described in U.S. Patent 2,802,531 to Cardwell et al. and U.S. application S.N. 655,955 filed April 30, 1957. To at least one of the liquids employed in the practice of the invention a propping agent is added. One method of injecting a fracturing liquid into a formation traversed by a well is described in Reissue Patent 23,733 to Farris. When two pumping systems are used, it is recommended that the base liquid be of the same general type in both systems, e.g., both oil or both water, or one oil and the other thickened oil or one water and the other thickened water. However, the invention may be practiced by using different liquids, e.g., water as the diluent and sand suspended in kerosene as the slurry.

The number of repetitions of the operation should be not less than three and is usually ten or more.

The period of interval between changes in rate of flow of the fracturing liquid or of the concentration of propping agent is best guided by observing indications of fracture and of pressure build-up. For example, when injecting the diluent at a high rate of flow a drop in pressure indicates a fracture at which time it is recommended that the rate of flow of the diluent be decreased and the rate of flow of the slurry be increased. Then, when injecting the slurry, a rise in pressure indicates a filling up of the fractures with propping agent. At that time the rate of flow of the slurry is decreased and the rate of flow of the diluent again increased. Fracturing pressures up to 3000 pounds and, under certain conditions, higher pressures are employed, in the invention similarly to conventional fracturing. Controlling the rates of flow and/or propping agent content of fracturing liquids in the practice of the invention may be referred to as demand surging.

When fracturing a formation by injecting down a wellbore having known characteristics, the periods of time between changes in rates of flow and/or propping agent concentration in the fracturing liquid may be timed without dependence upon indications of the occurrence of a fracture and may be referred to as fixed cycle surging. A period of time between 2 and 20 minutes between changes may be used but in most formations, a period of between 3 and 10 minutes between changes is usually more effective.

The invention may be used in gas or oil wells for fracturing strata below the casing or in strata located opposite perforated sections of the casing. It may also be employed in underground storage reservoirs or waste disposal wells to increase the permeability of the formation in which the reservoir or well is located.

The effectiveness of fracturing a formation due to the surging action accomplished by altering one or more fracturing liquids according to the invention is thought to be due to the opening up of existing fractures and creating new fractures by the liquid having little or no propping agent therein at a high rate of flow and alternately depositing in the fractures, thus opened up or created, the propping agent contained in the fracturing liquid having a high content of propping agent preferably injected at a lower rate of flow. The thus-deposited propping agent both holds open the fractures already made and diverts subsequently supplied fracturing liquid or low propping agent content into less accessible fractures.

The following example illustrates a mode of practicing the invention.

A well penetrating the gas-bearing Antrim shale in Midland County, Michigan, having a total depth of 2872 feet, was selected for treatment according to the invention. The well was cased to a depth of 2609 feet and uncased the balance of the depth. The wellbore below the casing was smooth and regular; it was calipered and found to have a diameter of about 9 inches. The well was producing no gas. A spinner survey of the well showed relatively low fluid loss at the gas-bearing level indicating low porosity at that level.

Two fracturing liquids were provided, one plain water and the second water-gelled with 20 pounds of guar gum/1000 gallons of water. A separate pumping system, each consisting of three pumps connected in series, was set up for each fracturing liquid and means provided for feeding 20 to 40 mesh Ottawa sand into the gelled water. The pumps employed in the fresh water system were high volume centrifugal pumps and those employed in the gelled water system were lower volume positive displacement pumps.

Fresh water was pumped into the well until the wellbore was full. Both pumping systems, one pumping fresh water and the other pumping gelled water, were then put in operation to pressurize the well at an injection rate which rose to 4000 gallons per minute resulting in a maximum pressure measured at the wellhead of 1500 p.s.i. at which time it dropped to 1100 p.s.i. indicating a fracture.

The sand was then started into the gelled water injection line at a rate of 6 pounds per gallon of gelled water and the high velocity fresh water pumps stopped. The sand thus carried into the formation began to bridge and prop fractures and openings in the formation. The sand bridged over and temporarily partially closed fractures and channels in the formation. The pressure fell off to 800 p.s.i. shortly after the high volume pumps were stopped and thereafter slowly rose to 900 p.s.i. as the sand entered the formation.

After 5 minutes, the high volume fresh water pumps were then started and the pressure raised to 1200 p.s.i. in 1 minute. The high volume pumps were then stopped. Thereafter a cycle of 1 minute on and 5 minutes off was maintained on the high volume fresh water pumps; the slurry pumps continued at a substantially steady rate of about 220 gallons per minute. The pressure rose to values varying between 1000 and 1300 p.s.i. at each surge of the high volume pumps and subsided to a value of between 800 and about 850 p.s.i. when the high volume pumps were stopped.

This surging procedure was maintained for three hours during which 250,000 pounds of sand, 40,000 gallons of gelled water, and 37,000 gallons of fresh water were pumped into the well.

The well was flushed out with water and put back in production. Gas flowed from the well in production quantities.

After 14 days, the well was again fractured in accordance with the invention. The procedure followed was substantially that employed above except for the following differences:

(1) The fresh water surge or high volume pumps were operated on demand, that is, were operated until the pressure rose to a peak and then dropped indicating that a fracture had occurred and thereafter were stopped, and only the gelled water-slurry pumps continued in operation until a gradual rise in pressure indicated a bridging or temporary plugging of channels and fractures when the surge pumps were again started.

(2) The pressure rose as high as 3200 p.s.i. during the surging operation.

(3) The treatment was continued for seven hours during which 700,000 pounds of sand, 130,000 gallons of gelled water, and 97,000 gallons of water were injected into the well.

The wellbore below the casing was again calipered and found to now have a very irregular wall surface in contrast to the relatively smooth surface before treatment and to have a diameter which varied from 9 to 13 inches which was a much enlarged average hole diameter over that before fracturing.

After thus fracturing the well according to the invention, it was checked for fluid loss in the zone between the levels of 2609 feet and 2614 feet. Fluid loss in this zone increased appreciably indicating fractures in the zone.

The well was put back in production and was producing at the rate of 54,000 cubic feet of gas per day after ten days of production.

Having described the invention, what is claimed and desired to be protected by Letters Patent is:

1. In a method of treating a fluid-bearing formation traversed by a wellbore by injecting a liquid, containing a propping agent suspended therein in an amount between about 2 pounds per gallon of said liquid and that which results in appreciable screening out in the wellbore, down the wellbore to create fractures in said formation and supply propping agent to said fractures, the improvement consisting essentially of fracturing the formation and repeatedly alternately increasing and decreasing the rate of supplying said propping agent to said fractures, thereby imparting a surging action to said suspended propping agent.

2. The method according to claim 1 wherein the period of time between each maximum increase in rate of flow is between 2 and 20 minutes.

3. In a method of fracturing a fluid-bearing formation traversed by a wellbore by injecting a fluid containing a propping agent suspended therein in an amount insufficient to screen out appreciably in the wellbore, to create fractures in the formation and supply propping agent to said fractures, the improvement consisting essentially of the steps of (1) fracturing the formation and (2) alternately increasing the rate of flow of the fracturing liquid while simultaneously decreasing the concentration of the propping agent suspended therein and thereafter (3) simultaneously decreasing the rate of flow of said fracturing liquid and increasing the propping agent concentration and thereafter continuing to repeat alternately steps (2) and (3) to impart a surging action to said suspended propping agent.

4. In a method of fracturing a fluid-bearing formation traversed by a wellbore by injecting a liquid, containing a propping agent suspended therein, to create fractures in the formation and supply propping agent to said fractures, the improvement consisting essentially of providing two liquid injection means, injecting down one of said injection means a first fracturing liquid selected from the class consisting of liquids having little and those having substantially no propping agent content and injecting down the other of said injection means a second fracturing liquid containing a gelling agent, to fracture the formation, introducing a propping agent into said second liquid containing the gelling agent, and decreasing the rate of flow of said first liquid, and thereafter alternately increasing the rate of flow of said first liquid to a rate greater than that of said second liquid and decreasing the rate of flow of said first liquid to a rate less than that of said second liquid, while maintaining the rate of flow of said second liquid substantially constant, thereby to increase and decrease the rate of supplying said propping agent to the fractures so created.

References Cited in the file of this patent

UNITED STATES PATENTS

| | | |
|---|---|---|
| 2,354,570 | Benchenstein | July 25, 1944 |
| 2,699,212 | Dismukes | Jan. 11, 1955 |
| 2,734,861 | Scott et al. | Feb. 14, 1956 |
| 2,811,207 | Clark | Oct. 29, 1957 |
| 2,838,116 | Clark et al. | June 10, 1958 |
| 2,859,821 | Trott | Nov. 11, 1958 |
| 2,888,988 | Clark | June 2, 1959 |
| 2,970,645 | Glass | Feb. 7, 1961 |

OTHER REFERENCES

Hassebroek, W. E., et al: "Hydraulic Fracturing," Oil and Gas Journal, Sept. 6, 1954, pages 109–112.